United States Patent
Doctor et al.

(10) Patent No.: US 10,002,348 B1
(45) Date of Patent: Jun. 19, 2018

(54) ROUTING AND PROCESSING OF PAYMENT TRANSACTIONS

(71) Applicant: Amazon Technologies, Inc., Seattle, WA (US)

(72) Inventors: Dennis Scott Doctor, Seattle, WA (US); Chelsea Celest Krueger, Seattle, WA (US); Tushaar Sethi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 202 days.

(21) Appl. No.: 13/950,045

(22) Filed: Jul. 24, 2013

(51) Int. Cl.
| | | |
|---|---|---|
| *G06Q 20/12* | (2012.01) | |
| *G06Q 30/06* | (2012.01) | |
| *G06Q 99/00* | (2006.01) | |
| *G06Q 20/10* | (2012.01) | |
| *G06Q 40/02* | (2012.01) | |
| *G06Q 20/20* | (2012.01) | |

(52) U.S. Cl.
CPC ........... *G06Q 20/123* (2013.01); *G06Q 20/10* (2013.01); *G06Q 20/204* (2013.01); *G06Q 30/0645* (2013.01); *G06Q 40/025* (2013.01); *G06Q 99/00* (2013.01); *Y10S 902/00* (2013.01)

(58) Field of Classification Search
CPC .............................. G06Q 40/00; G06Q 20/10
USPC ........................................................ 705/39
See application file for complete search history.

(56) References Cited

U.S. PATENT DOCUMENTS

| | | | | |
|---|---|---|---|---|
| 7,319,986 | B2 * | 1/2008 | Praisner ................. | G06Q 20/10 705/39 |
| 7,959,074 | B1 | 6/2011 | Chopra et al. | |
| 8,099,361 | B1 | 1/2012 | Gupta et al. | |
| 8,751,317 | B2 * | 6/2014 | Qawami ................ | G06Q 20/20 705/21 |
| 2002/0138418 | A1 * | 9/2002 | Zarin ..................... | G06Q 20/10 705/38 |
| 2004/0267643 | A1 | 12/2004 | Armes et al. | |
| 2006/0206486 | A1 * | 9/2006 | Strickland .............. | G06Q 10/10 |
| 2009/0171845 | A1 * | 7/2009 | Powell ................... | G06Q 20/32 705/44 |
| 2011/0106580 | A1 * | 5/2011 | Almeida ................ | G06Q 30/02 705/7.29 |
| 2012/0072347 | A1 * | 3/2012 | Conway ................. | G06Q 20/04 705/44 |

(Continued)

*Primary Examiner* — Eric T Wong
*Assistant Examiner* — Kevin Poe
(74) *Attorney, Agent, or Firm* — Lee & Hayes, PLLC

(57) ABSTRACT

A payment routing and processing platform is configured to collect various attributes for use in identifying an optimal payment processor for a particular payment transaction message. For example, the payment routing and processing platform might identify business attributes, endpoint attributes, customer and transaction attributes, payment method attributes, system attributes, and/or other types of attributes. The payment routing and processing platform might then utilize some or all of the identified attributes to select an endpoint for processing a payment transaction message. The payment routing and processing platform might also utilize some or all of the identified attributes to identify and perform other types of processing of financial transactions. Machine learning techniques might also be utilized to improve the performance of the payment routing and processing platform.

21 Claims, 6 Drawing Sheets

(56) References Cited

U.S. PATENT DOCUMENTS

| | | | | |
|---|---|---|---|---|
| 2012/0116902 A1* | 5/2012 | Cardina | ................ | G06Q 20/10 |
| | | | | 705/17 |
| 2012/0124656 A1* | 5/2012 | Senac | ................... | H04L 9/3213 |
| | | | | 726/9 |
| 2012/0221468 A1* | 8/2012 | Kumnick | ............... | G06Q 20/20 |
| | | | | 705/44 |
| 2012/0260121 A1* | 10/2012 | Yadav | ..................... | H04L 45/28 |
| | | | | 714/2 |
| 2013/0103578 A1* | 4/2013 | Mallean | ............ | G06Q 30/0255 |
| | | | | 705/39 |
| 2013/0144663 A1* | 6/2013 | Qawami | ................ | G06Q 10/02 |
| | | | | 705/5 |
| 2013/0304626 A1* | 11/2013 | Aisen | ................... | H04L 43/0852 |
| | | | | 705/37 |
| 2014/0095379 A1* | 4/2014 | Williams | ............... | G06Q 20/38 |
| | | | | 705/39 |
| 2014/0258118 A1* | 9/2014 | Scott | .................... | G06Q 20/204 |
| | | | | 705/44 |
| 2014/0304158 A1* | 10/2014 | Basu | ..................... | G06Q 20/02 |
| | | | | 705/44 |

\* cited by examiner

ROUTING AND PROCESSING OF PAYMENT TRANSACTIONS

BACKGROUND

Electronic commerce transactions between an online merchant and its customers frequently involve the online merchant interacting with one or more third-party payment processors. For example, an online merchant might utilize one or more third-party payment processors to obtain a payment approval or guarantee for a customer purchase or other type of payment transaction.

For various reasons, it might not be possible for an online merchant to obtain a payment approval or guarantee at the time a customer makes a purchase. For example, a third-party payment processor might be inaccessible, and therefore unable to provide a payment approval or guarantee to an online merchant, due to a malfunction at a third-party payment processor, due to the failure of one or more data communications networks utilized to connect the merchant to a third-party payment processor, or due to the failure of components in the online merchant's system that are utilized to interact with a third-party payment processor. An online merchant might also be unable to obtain a payment approval or guarantee from a third-party payment processor, or to obtain a payment approval or guarantee in a timely fashion, for other reasons.

The failure of an online merchant to complete a payment transaction for a customer can result in a poor customer experience. For example, if a payment transaction is declined for a reason that is unrelated to the validity of the payment information provided by the customer, such as those described above, the customer might receive an indication that their payment could not be processed and be asked to re-enter their payment information. This can be very frustrating to a customer. The failure of a payment transaction to complete in a timely fashion might also be confusing and frustrating to the customers of an online merchant.

The inability to complete a payment transaction in a timely fashion might also subject an online merchant to financial risk in certain scenarios. For example, merchants typically do not ship physical items to customers until a payment guarantee for the items has been obtained. Some online merchants, however, utilize "optimistic" fulfillment with regard to digital items (e.g. audio and video files delivered digitally). Utilizing optimistic fulfillment, an online merchant might deliver ordered digital items to a customer after some period of time elapses after the order is placed, even though the online merchant has not yet received a payment approval or guarantee for the transaction. If the online merchant cannot subsequently obtain payment for the items, the online merchant will have suffered a financial loss.

The disclosure made herein is presented with respect to these and other considerations.

DETAILED DESCRIPTION

Figure 1:
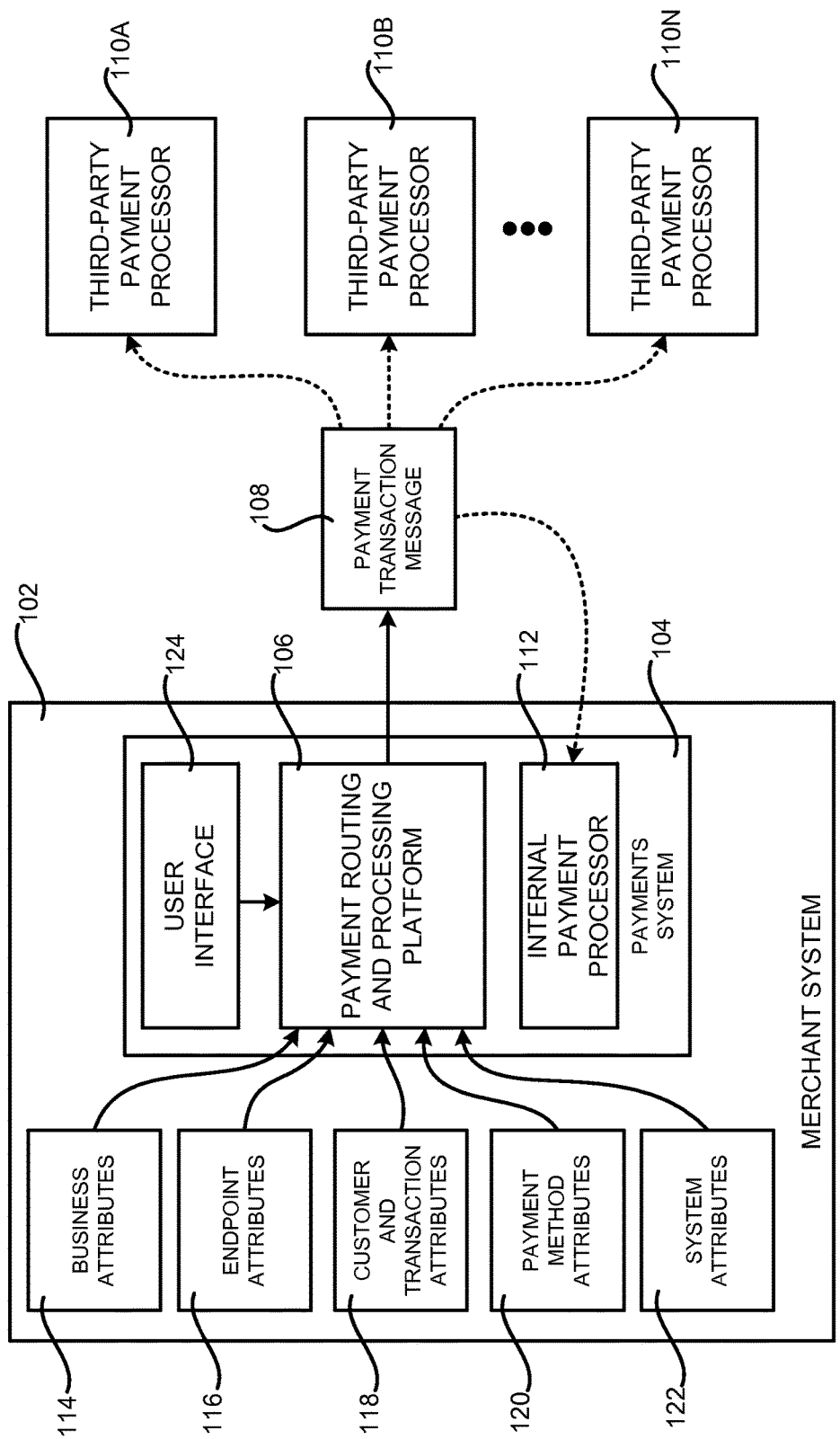
FIG. 1 is a software architecture diagram showing an overview of one illustrative mechanism described herein for optimized routing of payment transactions, according to one embodiment disclosed herein.

The following detailed description is directed to technologies for optimized routing and processing of payment transactions. Utilizing the technologies described herein, payment transactions can be routed to payment processors and processed in other ways in a manner designed to provide a high quality customer experience. The technologies disclosed herein might also be utilized to route and process payment transactions in order to reduce the risk of loss to a merchant that utilizes optimistic fulfillment, reduce the cost of payment processing for the merchant and, potentially, improve other operational and financial considerations for the merchant.

According to one aspect presented herein, a computer-implemented mechanism is disclosed for optimized routing of financial transactions. This mechanism might be implemented in a payment routing and processing platform that is integrated with a payments system operated by a merchant. The payment routing and processing platform may be configured to collect various attributes for use in identifying an optimal payment processor for a particular payment transaction message. For example, in various embodiments, the payment routing and processing platform might identify business attributes, endpoint attributes, customer and transaction attributes, payment method attributes, and/or system attributes. The payment routing and processing platform might then utilize some or all of these attributes in selecting an endpoint for processing payment transaction messages.

The payment routing and processing platform might also utilize some or all of the attributes identified above in performing other types of processing of financial transactions. Machine learning techniques might also be utilized to improve the performance of the payment routing and processing platform in embodiments. Additional details regarding the various components and processes described above for optimized routing and processing of payment transactions will be presented below with regard to FIGS. 1-6.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable electronic devices, minicomputers, mainframe computers, handheld computers, personal digital assistants, e-readers, cellular telephone devices, special-purposed hardware devices, network appliances, and the like. The embodiments described herein might also be practiced in distributed computing environments, where tasks may be performed by remote computing devices that are linked through a communications network. In a distributed computing environment, program modules may be located in and executed from both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1 is a software architecture diagram showing an overview of one illustrative mechanism described herein for optimized routing of payment transactions, according to one embodiment disclosed herein. As shown in FIG. 1, an online merchant might operate a merchant system 102. The merchant system 102 might provide a World Wide Web ("Web") store or other type of online marketplace (not shown) from which customers of the online merchant might purchase, rent, or otherwise obtain items. As mentioned above, the items offered through the online marketplace might be physical items or digital items, such as audio and video files that are delivered digitally. Various business lines (which might also be referred to as "business units") of the online merchant might offer items through the online marketplace. In this regard, it should be appreciated that the embodiments disclosed herein are not limited to use by an online merchant and might also be utilized by other types of merchants and entities.

The customers of the online merchant that operates the merchant system 102 might utilize client computing systems (not shown) to engage in various types of interactions with the merchant system 102. For example, a customer might utilize a client computing system in order to place an order for the purchase or rental of a physical or digital item. Customers of the online merchant might also perform other types of interactions with the merchant system 102 in order to initiate a transaction. It should be appreciated that the term "customer" as utilized herein might refer to an individual or organization purchasing items through the merchant system 102, a seller of items on a marketplace provided by the merchant system 102, a developer of software sold through a software application store provided by the merchant system 102, a publisher of a book or other type of publication that is offered for sale through an electronic book store provided by the merchant system 102, or another type of individual, for-profit, non-profit, or government entity.

Customers of the merchant system 102 typically possess one or more payment instruments issued by one or more financial institutions (not shown). For example, customers of the merchant system 102 might possess one or more credit cards, charge cards, stored value cards, ATM cards, and/or other types of payment instruments. Customers of the merchant system 102 might provide information about their payment instruments (e.g. credit card number, expiration date, name on the account, etc.) to the merchant system 102 for use in paying for purchased or rented items.

Some merchant systems 102 might also allow customers to specify various preferences about how their payment instruments are applied to each transaction. For example, customers might be permitted to specify in advance, or at the time of purchase, that purchases be split among several payment instruments in a particular manner. It should be appreciated that the merchant system 102 might also support the completion of transactions utilizing other types of payment instruments including, but not limited to, stored value accounts (i.e. gift cards), pre-paid cards, payment using points accrued through a card issuer, and other types of payment mechanisms. In this regard, it should also be appreciated that the term "payment instrument" as utilized herein encompasses any instrument that might be utilized for payment, and should not be limited to a credit card or other particular type of payment instrument.

In order to handle the processing of payments and other types of financial transactions, the merchant system 102 might be configured in various embodiments with a payments system 104. The payments system 104 provides functionality for, among other things, processing of payments made by customers for the purchase or rental of items from the merchant system 102. The payments system 104 might also provide functionality for processing refunds and other types of financial transactions.

Various other components within the merchant system 102 not illustrated in FIG. 1 might interact with the payments system 104 in order to initiate the processing of financial transactions. For example, a component within the merchant system 102 for providing an online marketplace might submit requests to authorize or complete financial transactions to the payments system 104. Many other components within the merchant system 102 not illustrated in FIG. 1 might also utilize services provided by the payments system 104.

One particular type of processing performed by the payments system 104 involves interaction with one or more third-party payment processors 110A-110N (which might be referred to herein individually as "a third-party payment processor 110" or collectively as "the third-party payment processors 110"). For example, a component within the payments system 104, such as the payment routing and processing platform 106, might utilize the payment instrument information for a customer and the transaction amount (i.e. the cost of items and any associated taxes and/or fees) to obtain authorization and/or a payment guarantee from one of the third-party payment processors 110.

In order to obtain the payment authorization and/or guarantee, the payment routing and processing platform 106 might generate a payment transaction message 108 that includes the payment instrument information and the transaction information. The payment transaction message 108 might be formatted to request payment authorization, payment settlement, and/or a full financial message (i.e. both authorization and settlement).

The payment routing and processing platform 106 might also be configured to route payment transaction messages 108 to third-party payment processors 110 for processing. The third-party payment processors 110 might include, for example, one payment processing system for each type of payment instrument, such as systems that act as intermediaries between a merchant and the financial institutions that provide payment instruments of that type. The third-party processors 110 might be credit card payment processing systems, an automated clearinghouse ("ACH"), or another type of system configured to provide a payment approval or guarantee for a customer. As shown in FIG. 1, the payment routing and processing platform 106 might also be configured to route a payment transaction message 108 to an internal payment processor 112 within the payments system 104 for processing transactions involving certain types of payment instruments, such as gift cards issued by the merchant that operates the merchant system 102.

When provided with information about a transaction amount (or an amount to be held or reserved for later payment) and a payment instrument (e.g. a particular credit card, bank, or other financial account) for a particular person or entity, the third-party payment processors 110 might respond with an approval of the transaction, a soft decline (e.g. when a credit card is over its limit, an expiration date is near or has passed, or the payment instrument issuer is unavailable), or a hard decline (e.g. a credit card has been reported lost or stolen). Payment transaction messages for which certain types of responses (e.g. soft declines) are received might be resubmitted at a later time for approval.

As mentioned briefly above, it might not be possible for the merchant system 102 to obtain a payment approval or guarantee from a third-party payment processor 110 at the time a customer makes a purchase. For example, a third-party payment processor 110 might be inaccessible, and therefore unable to provide a payment approval or guarantee to the merchant system 102, due to a malfunction at a third-party payment processor 110, due to the failure of one or more data communications networks utilized to connect the merchant system 102 to a third-party payment processor 110, or due to the failure of components in the merchant system 102 that are utilized to interact with a third-party payment processor 110. The merchant system 102 might also be unable to obtain a payment approval or guarantee from a third-party payment processor 110, or to obtain a payment approval or guarantee in a timely fashion, for other reasons.

As also mentioned briefly above, the failure of the merchant system 102 to complete a payment transaction for a customer can result in a poor customer experience. For example, if a payment transaction is declined for a reason that is unrelated to the validity of the payment instrument provided by the customer (i.e. the customer has provided information for a valid payment instrument), such as those described above, the customer might receive an indication that their payment could not be processed and be asked to re-enter their payment information. This can be very frustrating to a customer. The failure of a payment transaction to complete in a timely fashion might also be confusing and frustrating to the customers of the merchant system 102. The failure of a payment transaction to complete in a timely fashion might also result in lost sales if the customer abandons the transaction due to the delay in processing.

The inability to complete a payment transaction in a timely fashion might also subject the online merchant that operates the merchant system 102 to financial risk. As mentioned above, if the online merchant utilizes optimistic fulfillment, the online merchant might deliver ordered digital items to a customer after some short period of time (e.g. three seconds) elapses after the order has been placed, even though the online merchant has not yet received a payment approval or guarantee for the transaction. Although payment transaction messages 108 can be resubmitted at a later time, the online merchant will have suffered a financial loss if the online merchant cannot subsequently obtain payment for the items. The various concepts and technologies disclosed herein attempt to address these and, potentially, other considerations.

In order to address at least some of the considerations set forth above, the payment routing and processing platform 106 of the payments system 104 is configured in some embodiments disclosed herein to provide functionality for intelligent routing of payment transaction messages 108 to the third-party payment processors 110. Through an implementation of this functionality, the third-party payment processor 110 to which a particular payment transaction message 108 is routed can be selected dynamically, in real or near-real time, and in a manner designed to optimize for a positive customer experience (i.e. speed of transaction processing), to minimize the possibility that a transaction will be declined (i.e. maximize the possibility that a transaction will be approved), to reduce or eliminate the risk of loss due to optimistic fulfillment (i.e. complete transaction processing prior to fulfillment), to minimize the cost of payment processing, and/or to optimize for other factors. Additional details regarding these and other aspects will be provided below.

In order to route a payment transaction message 108 to an optimal third-party payment processor 110 (or the internal payment processor 112), the payment routing and processing platform 106 is configured to obtain data regarding various business attributes 114, endpoint attributes 116, customer and transaction attributes 118, payment method attributes 120, and/or system attributes 122. The payment routing and processing platform 106 might then utilize some or all of the collected data to select an appropriate payment processor 110 or 112 for processing a particular transaction. The data described above may be obtained, processed, analyzed, and utilized to dynamically select an appropriate payment processor in real or near-real time. In this regard, it should be appreciated that the attributes described above might be utilized in various combinations in various implementations. For example, in some implementations, the endpoint attributes 116 and one or more of the other attributes might be utilized to make a routing decision or to performing processing in some way. Other combinations of the attributes described above might also be utilized in other embodiments. Additional details regarding the various inputs to the payment routing and processing platform 106 and the use of this data in routing a payment transaction message 108 are presented below.

As mentioned briefly above, the routing and processing platform 106 may be configured to obtain data regarding business attributes 114, endpoint attributes 116, customer and transaction attributes 118, payment method attributes 120, and/or system attributes 122. Each of these attribute types are described in detail below. In particular, the endpoint attributes 116 are attributes of an "endpoint" to which a payment transaction message 108 is to be routed. For example, the third-party payment processors 110 and the internal payment processor 112 might be considered endpoints. Other systems not shown in FIG. 1 might also be utilized as an endpoint for a payment transaction message 108.

The endpoint attributes 116 include, but are not limited to, the current, historical and/or predicted future availability of an endpoint, the number and/or frequency of errors (e.g. false rejects) generated by an endpoint, the current, historical and/or predicted future latency to an endpoint or of a network connection to an endpoint, current, historical and/or predicted future approval and/or decline rates of an endpoint, current, historical, and/or predicted future soft and hard decline rates of an endpoint, detected transaction type specific problems with an endpoint, the current, historical, and/or predicted future timeout rate of an endpoint, response codes generated by an endpoint, the idempotentcy (i.e. ability to detect and/or avoid duplicate charges) of an endpoint, and/or other characteristics of the current or historical operation of an endpoint. It should be appreciated that historical data might be expressed in various ways including, but not limited to, running averages.

It should be appreciated that many of the endpoint attributes 116 described above may be determined dynamically based upon actual communication with an endpoint. For example, "heartbeat" messages may be transmitted to endpoints to determine their current availability. Historical availability might similarly be determined based upon the results of actual payment transaction messages 108 sent to the endpoints. Other real-time and historical endpoint attributes 116 might be dynamically generated in a similar fashion.

Some endpoint attributes 116 might also be static (i.e. specified in advance of the routing or processing of a particular financial transaction). For example, the endpoint attributes 116 might include heartbeat service level agreements ("SLAs"), transaction failure SLAs, capacity thresholds, endpoint partner contract terms (e.g. volume obligations), and other types of attributes associated with an endpoint that are specified in advance of the routing or processing of a particular financial transaction.

As described briefly above, the payment routing and processing platform 106 might utilize the endpoint attributes 116 to identify an optimal payment processor for processing a particular payment transaction message 108. For example, the payment routing and processing platform 106 might utilize the availability of a particular endpoint to determine whether a particular payment transaction message 108 can be routed to the endpoint. As mentioned above, the availability of each endpoint can be proactively monitored with a heartbeat mechanism. If a heartbeat "echo" is not returned from an endpoint, the payment routing and processing platform 106 may assume that the endpoint is unavailable to receive payment transaction messages 108. Other mechanisms might also be utilized to determine the current status and/or availability of endpoints.

The payment routing and processing platform 106 might similarly monitor the response time from the endpoints (i.e. the time period between when a transaction message 108 leaves the network boundary of the merchant system 102 and when a response is received). If the response time is more than a pre-defined, configurable threshold for a particular endpoint, the payment routing and processing platform 106 might stop routing payment transaction messages 108 to that endpoint. Other, more complex, logic might also be utilized to modify the manner in which payment transaction messages 108 are routed when multiple, potentially backup, endpoints are also incurring response times longer than the desired threshold.

As another example, the payment routing and processing platform 106 might determine if a particular endpoint is returning a high percentage of soft declines (i.e. greater than 5% per 30 minutes). In this case, the payment routing and processing platform 106 might flag the endpoint and temporarily route payment transaction messages 108 to other endpoints until the problem condition has been resolved. The payment routing and processing platform 106 may again begin utilizing the problematic endpoint for routing in response to a manual reset through the user interface ("UI") 124, or through a heartbeat or health check with the problematic endpoint that indicates that the problem condition has been resolved.

In other examples, the payment routing and processing platform 106 might also be configured to route payment transaction messages 108 to endpoints based upon the approval/decline rate of each endpoint. The payment routing and processing platform 106 might also determine whether or not to retry a payment transaction message 108 based upon a response code that is returned by an endpoint. In addition, and as will be described in greater detail below, the payment routing and processing platform 106 might utilize machine learning techniques to "learn" over time whether or not to submit a payment transaction message 108 through another endpoint if there is a high likelihood of a positive outcome (e.g. approval).

The payment routing and processing platform 106 might also route payment transaction messages 108 based upon the business arrangement (i.e. contract terms) that the online merchant has with the provider of each endpoint. Business agreement might also dictate that the payment routing and processing platform 106 send a minimum amount of transactions (on a monthly, quarterly, or other time period basis as specified in the agreement) to a particular endpoint. The payment routing and processing platform 106 may be configured to honor these agreements.

Business agreements might also be created in such a way as to allow tiered pricing (e.g. price per transactions drop after a certain volume). In these cases, the payment routing and processing platform 106 may be configured to dynamically route payment transaction messages 108 based on cost optimization criteria that are configurable through the UI 124. It should be appreciated that the examples given above are merely illustrative and that the payment routing and processing platform 106 might route payment transaction messages 108 using the endpoint attributes 116 in other ways not specifically mentioned herein.

The customer and transaction attributes 118 are attributes of a current transaction (i.e. the transaction that is the subject of a particular payment transaction message 108) and the customer associated with the transaction. The customer and transaction attributes 118 include, but are not limited to, a transaction amount, transaction type, customer payment preferences such as those described above, the time of day/month/year that a transaction is initiated, the transaction history of the customer, a customer identifier, a merchant identifier, the location at which a transaction has been initiated (e.g. a point-of-sale location) and/or other attributes of the customer and/or the transaction. The customer and transaction attributes 118 might also include some or all of the business attributes 114 described below.

The payment routing and processing platform 106 might also utilize the customer and transaction attributes 118 to identify an optimal payment processor for processing a particular payment transaction message 108. For example, a customer of the merchant system 102 might set various payment preferences in the manner described above. For example, a customer might set their preference (through an appropriate UI) to "opt-out" of ATM Rails and always have their transactions processed as a Signature debit transaction. The payment routing and processing platform 106 can then utilize the customer payment preferences when routing a payment transaction message 108 for a transaction initiated by the customer. In some embodiments, the payment routing and processing platform 106 will give the specified customer preferences the highest priority in deciding the transaction routing.

The payment routing and processing platform 106 might also utilize the amount of a transaction in determining the routing for a particular payment transaction message 108. For example, authorizations over $100 might be processed through direct connections to systems operated directly by credit card brands, while transactions below $100 might be processed through an acquirer.

As another example, the payment routing and processing platform 106 might utilize the time of day, month, or year to determine how a transaction is processed. For example, in certain cases there may be cut-off windows for funds settlement globally. If a settlement market in the United Kingdom is closed, the payment routing and processing platform 106 might decide to utilize a United States-based bank to settle funds more quickly and provide better access to this cash flow. In another time-related example, the payment routing and processing platform 106 might utilize the lowest cost endpoint for processing transactions except during a time of day designated as a peak ordering or shipping time. During peak ordering or shipping times, the payment routing and processing platform 106 might utilize a different, faster endpoint even at a higher cost.

In some embodiments, past and/or predicted future processing performance for a particular transaction type might also be utilized to select an endpoint to process a particular transaction. It should be appreciated that the examples given above are merely illustrative and that the payment routing and processing platform 106 might route payment transaction messages 108 using the customer and transaction attributes 118 in other ways not specifically mentioned herein.

The payment method attributes 120 are attributes of a particular payment instrument specified by a payment transaction message 108. The payment method attributes 120 include, but are not limited to, the payment instrument type (e.g. credit card, points, etc.), the cost of processing of payments using the payment instrument type, rewards provided by the payment instrument type, and/or other attributes of the payment instrument specified in a payment transaction message 108.

The payment routing and processing platform 106 might also utilize the payment method attributes 120 to identify an optimal payment processor for processing a particular payment transaction message 108. For example, the payment routing and processing platform 106 might maintain or access a pricing table that identifies the cost for each payment method (processing fees, interchange, by country, on/off-merchant, by MCC, by BIN). The payment routing and processing platform 106 might then utilize this data to identify the lowest cost endpoint for processing a particular payment transaction message.

The payment routing and processing platform 106 might also utilize a cost of processing algorithm that considers the cost of payment lifecycle of a transaction. For example, while routing a transaction through one endpoint may cost less initially-the transaction settles, but may end up adding more to the bad debt-a failure after settle condition may occur. Also, in case of split transactions (e.g. both authorization and settlement), there can be certain economies of scale when routing through the same endpoint. The payment routing and processing platform 106 might take these, and other, considerations into account when selecting an endpoint for a particular payment transaction message 108. It should be appreciated that the examples given above are merely illustrative and that the payment routing and processing platform 106 might route payment transaction messages 108 using the payment method attributes 120 in other ways not specifically mentioned herein.

The business attributes 114 are attributes of a business line or unit of the online merchant from which a purchase or other type of financial transaction has been initiated. The business attributes 114 include, but are not limited to, the type of business line (e.g. physical or digital products), the manner in which products are shipped by the business line (e.g. same day/next day shipping), the merchant identifier, the location of the business line, and/or other attributes of a business line operated by the online merchant that operates the merchant system 102.

The payment routing and processing platform 106 might also utilize the business attributes 114 to identify an optimal payment processor for processing a particular payment transaction message 108. The particular business line might be permitted to specify any particular requirements that they have. For example, a particular business line selling or renting digital items that utilizes optimistic fulfillment might require a very fast processing time. The payment routing and processing platform 106 might utilize these requirements specified by each business line when routing payment transaction messages 108 for transactions related to each business line.

In another example, the type of business line (e.g. merchant ID) might be utilized to select a particular endpoint. For example, if the business line delivers items digitally, an endpoint with a very low latency might be selected even though the endpoint has a higher cost as compared to other endpoints. In this way, what would ordinarily be optimistic fulfillment might be converted to non-optimistic fulfillment when the payment transaction message 108 can be processed and a result obtained prior to fulfillment of a digital item. A similar process might also be utilized for routing transactions for business lines that sell physical items, but that ship the items very quickly (e.g. same day shipping or delivery). Likewise, a similar process might also be utilized for routing transactions generated in a point of sale environment.

The payment routing and processing platform 106 might also be able to determine if an authorization or charge should expect a synchronous or asynchronous response. The payment routing and processing platform 106 may be provided with the appropriate payment instrument, business/client data (e.g. MCC, shipping method) and metadata about the transaction. It should be appreciated that the examples given above are merely illustrative and that the payment routing and processing platform 106 might route payment transaction messages 108 using the business attributes 114 in other ways not specifically mentioned herein.

The system attributes 122 are attributes that describe the current, historical, and/or predicted future operation of components within the payments system 104. For example, and without limitation, the system attributes 122 might include the current, historical, and/or predicted future status of network components, such as routers, firewalls, and switches, the current, historical, and/or predicted future status and availability of relevant systems internal to the payments system 104 and/or the merchant system 102, the results of diagnostics performed on components internal to the payments system 104 and/or the merchant system 102, current, historical, and/or predicted incoming request rates, and/or other information describing the operational state of components within the payments system 104 or the merchant system 102. The payment routing and processing platform 106 might also utilize the system attributes 122 to identify an optimal payment processor for processing a particular payment transaction message 108. The payment routing and processing platform 106 might also utilize the system attributes 122 to determine the manner in which a particular transaction is processed.

It should be appreciated that the various attributes described above are merely illustrative and that the payment routing and processing platform 106 might utilize other attributes not specifically mentioned herein to make a routing decision for a payment transaction message 108. It should also be appreciated that the various attributes described above might be static (i.e. pre-defined) or dynamic (i.e. obtained at or around the time a routing or processing decision is being made). Additionally, it should be further appreciated that some of the attributes identified above might be specified manually by an authorized user (e.g. through the UI 124 provided by the payments system 104), while other attributes might be machine-generated or machine learning generated. The various attributes described above might also be obtained from systems and/or components within the merchant system 102 and/or from systems and/or components external to the merchant system 102, such as the third-party payment processors 110.

As mentioned briefly above, the payments system 104 includes a UI 124 in some embodiments for configuration and monitoring of the operation of the payment routing and processing platform 106. The UI 124 might be a secure Web-based UI or another type of UI usable by an authorized individual to configure the various aspects of the operation of the payment routing and processing platform 106 described below, and potentially other aspects. For example, the UI 124 might be configured to provide functionality for allowing an individual to configure processing and routing attributes of endpoints, such as some of the static endpoint attributes 116 described above. The UI 124 might also provide ad hoc metrics and reporting capabilities, as well as pre-defined metrics and reporting that can be used to manage different business and operational support needs.

The UI 124 might also provide functionality for allowing a user to address planned network downtime for scheduled maintenance or for enhancement purposes. In this regard, the UI 124 might allow a user to input downtime parameters, such as date and time information to manage the processing route for the impacted transactions (i.e. no routing to an endpoint during the time period established in the UI 124).

The UI 124 might also provide functionality for allowing a user to configure the payment routing and processing platform 106 to route a percentage of total authorizations, charges and other transaction types to a particular destination endpoint. Users having the appropriate permissions might be permitted to override system settings that have been pre-configured to route transactions in this way.

The UI 124 might also provide functionality for allowing a user to configure the payment routing and processing platform 106 to automatically increase transaction volumes to particular endpoints over time. These settings may be presented in a manner so as to allow users to configure custom implementation strategies (i.e. 10% volume for one week, then 25% volume for 2 weeks, then 50% volume for 1 month, then 100% volume).

The UI 124 might also provide default settings for these types of strategies. The UI 124 might also be configured to provide various metrics and reporting data on the status of the various endpoints, the payment routing and processing platform 106, the internal payment processor 112, and other components in the merchant system 102. The UI 124 might also provide other functionality and information not specifically mention herein.

It should be appreciated that the merchant system 102 illustrated in FIG. 1 has been simplified for discussion purposes. It should also be appreciated that the merchant system 102 might include many more software and hardware components than illustrated in FIG. 1. It should be further illustrated that the interaction between the merchant system 102 and the third-party payment processors 110 has also been simplified in FIG. 1 for discussion purposes. As known to those skilled in the art, many other networks and computing systems might be involved in processing a payment transaction message 108 and performing the other types of financial transactions described herein. Additional details regarding the operation of the payment routing and processing platform 106 for routing transactions based upon at least some of the various attributes described above and, potentially other attributes, will be provided below with regard to FIG. 2.

Figure 2:
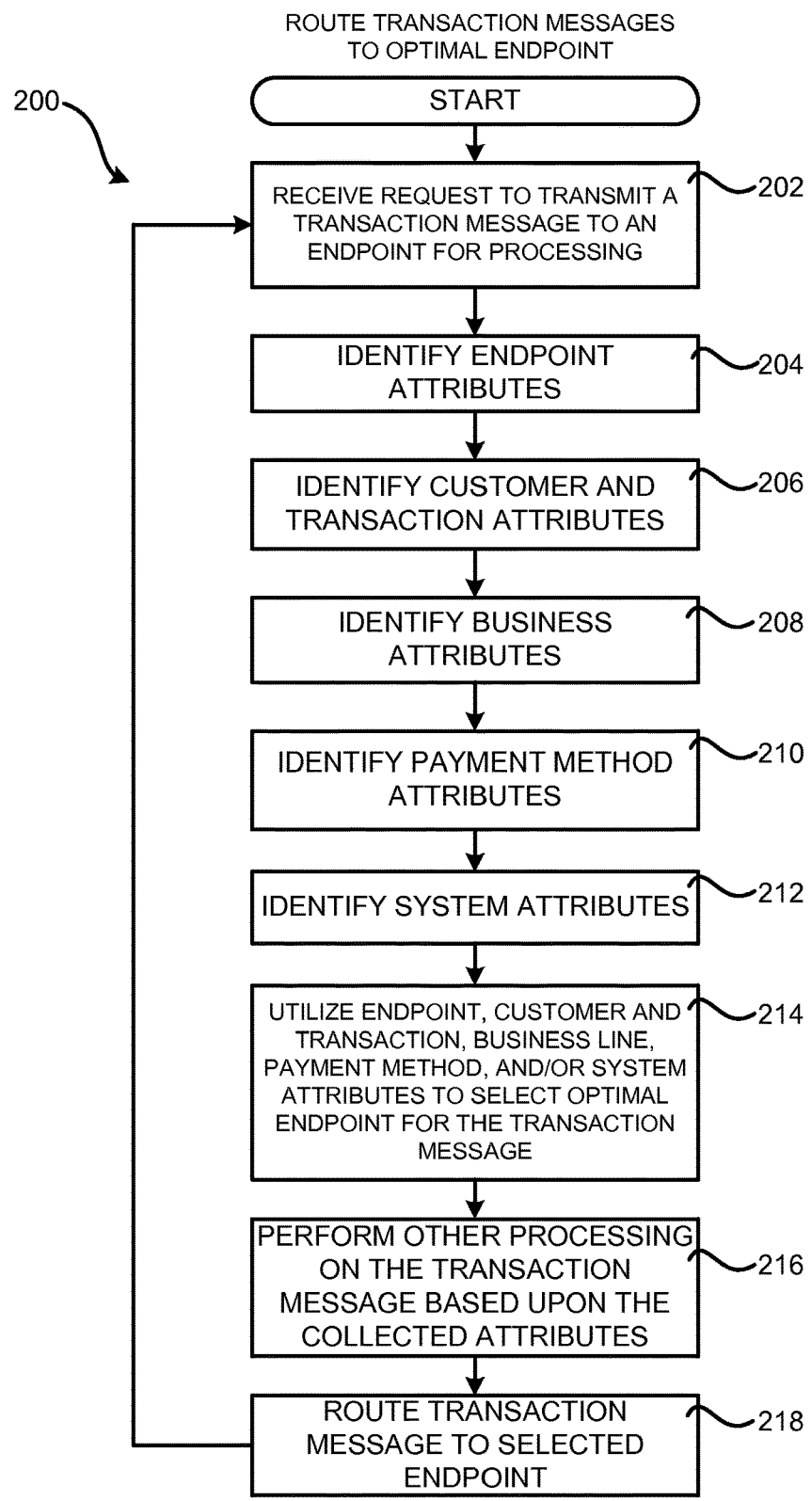
FIG. 2 is a flow diagram showing aspects of the operation of one mechanism disclosed herein for optimized routing of payment transactions, according to one embodiment disclosed herein.

FIG. 2 is a flow diagram showing a routine 200 that illustrates aspects of the operation of one mechanism disclosed herein for optimized routing of payment transactions, such as payment transaction messages 108, according to one embodiment disclosed herein. It should be appreciated that the logical operations described herein with respect to FIG. 2, and the other FIGS. might be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein.

The routine 200 begins at operation 202, where the payment routing and processing platform 106 receives a request to route a payment transaction message 108 to an endpoint. As mentioned briefly above, such a request might be received from a component within the merchant system 102, such as a component within the merchant system 102 for providing an online marketplace. Many other types of components within the merchant system 102 might also submit such a request to the payment routing and processing platform 106.

From operation 202, the routine 200 proceeds to operation 204, where the payment routing and processing platform 106 identifies the endpoint attributes 116 associated with available endpoints, such as the third-party payment processors 110 and the internal payment processor 112. As mentioned above, endpoint attributes 116 are attributes of an "endpoint" to which a payment transaction message 108 is to be routed. As also discussed above, the endpoint attributes 116 might be static or dynamic. In the case of dynamic endpoint attributes 116, such as the current availability of an endpoint, values for the attributes might be retrieved in response to receiving a request to route a payment transaction message 108. In this way, the routing determination can be made based upon currently available information. This applies also to any other attributes that might change over time.

From operation 204, the routine 200 proceeds to operation 206, where the payment routing and processing platform 106 identifies the customer and transaction attributes 118 associated with the payment transaction message 108 to be routed. As discussed above, the customer and transaction attributes 118 are attributes of a current transaction (i.e. the transaction that is the subject of a particular payment transaction message 108) and the customer associated with the transaction. Once the payment routing and processing platform 106 identifies the customer and transaction attributes 118 associated with the payment transaction message 108 to be routed, the routine 200 proceeds from operation 206 to operation 208.

At operation 208, the payment routing and processing platform 106 identifies the business attributes 114 for the business line associated with the transaction. As discussed above, the business attributes 114 are attributes of a business line or unit of the online merchant from which a purchase or other type of financial transaction has been initiated. Once the payment routing and processing platform 106 identifies the relevant business attributes 114, the routine 200 proceeds from operation 208 to operation 210.

At operation 210, the payment routing and processing platform 106 identifies the payment method attributes 120 specified by the payment transaction message 108 to be routed. As discussed above, the payment method attributes 120 are attributes of a particular payment instrument specified by a payment transaction message 108. Once the payment routing and processing platform 106 identifies the payment method attributes 120 for the current transaction, the routine 200 proceeds from operation 210 to operation 212.

At operation 212, the payment routing and processing platform 106 identifies the system attributes 122. As mentioned above, the system attributes 122 are attributes that describe the current and/or historical operation of components within the payments system 104. Once the payment routing and processing platform 106 identifies the current system attributes 122, the routine 200 proceeds from operation 212 to operation 214.

At operation 214, the payment routing and processing platform 106 utilizes the business attributes 114, the endpoint attributes 116, the customer and transaction attributes 118, the payment method attributes 120, and/or the system attributes 122 to select an endpoint for the payment transaction message 108. As discussed above, the various attributes described above might be utilized to select an endpoint, such as a third-party processor 110 or the internal payment processor 112, that is optimized for a positive customer experience (i.e. speed of transaction processing), to minimize the possibility that a transaction will be declined (i.e. maximize the possibility that a transaction will be approved), to reduce or eliminate the risk of loss due to optimistic fulfillment (i.e. complete transaction processing prior to fulfillment), to minimize the cost of payment processing, and/or to optimize for a combination of these or other factors. Once the payment routing and processing platform 106 has selected an endpoint, the routine 200 proceeds from operation 214 to operation 216.

At operation 216, the payment routing and processing platform 106 might utilize some or all of the attributes described above to perform other types of processing on the payment transaction message 108 prior to routing the message 108. For example, and as mentioned above, the payment routing and processing platform 106 might utilize the endpoint attributes 116 and/or the customer and transaction attributes 118 to determine whether to add a card verification value ("CVV") to the payment transaction message 108. The payment routing and processing platform 106 might utilize some or all of the attributes described above to perform other types of processing at operation 216.

From operation 216, the routine 200 proceeds to operation 218, where the payment routing and processing platform 106 routes the payment transaction message 108 to the selected endpoint. Following the transmission of the payment transaction message 108, the payment routing and processing platform 106 might also receive a response message. As mentioned above, some or all of the attributes described above might be utilized to determine how to perform additional processing, such as to which endpoint the payment transaction message 108 should be resubmitted, following the receipt of the response message. From operation 216, the routine 200 proceeds to operation 218, where it ends.

Although the discussion above regarding the functionality provided by the payment routing and processing platform 106 has been primarily presented in the context of routing payment transaction messages 108, it should be appreciated that the payment routing and processing platform 106 might also utilize the various attributes described to process financial transactions in other ways. For example, in some implementations, the payment routing and processing platform 106 might utilize the mechanisms described above to determine if additional message characteristics, such as a CVV, should be applied to a payment transaction message 108 destined for a particular endpoint.

In other embodiments, the payment routing and processing platform 106 might also utilize the various attributes described above to determine whether "stand-in" processing should be utilized for a particular transaction. Stand-in processing refers to a process whereby the payments system 104 "stands-in" for a particular endpoint in order to allow a customer to complete a purchase. The payment routing and processing platform 106 might utilize customer and transaction attributes 118, payment method attributes 120, business attributes 114, and/or endpoint attributes 116 to determine whether stand-in processing should be utilized for a particular transaction.

The payment routing and processing platform 106 might also utilize some or all of the attributes described above to determine when to utilize other features of the payments system 104, such as, but not limited to, authorization reuse, authorization reversal, charge aggregation, up front charge, and batch/real-time processing. The payment routing and processing platform 106 might also utilize some or all of the attributes described above to identify which endpoint to utilize to retry a failed transaction message. The payment routing and processing platform 106 might also utilize some or all of the attributes described above to determine the manner in which other types of processing are performed. The payment routing and processing platform 106 might also utilize some or all of the attributes described above to perform other types of processing. Additional details regarding the use of the various attributes described above to process financial transactions in ways other than routing will be described below with regard to FIG. 3.

Figure 3:
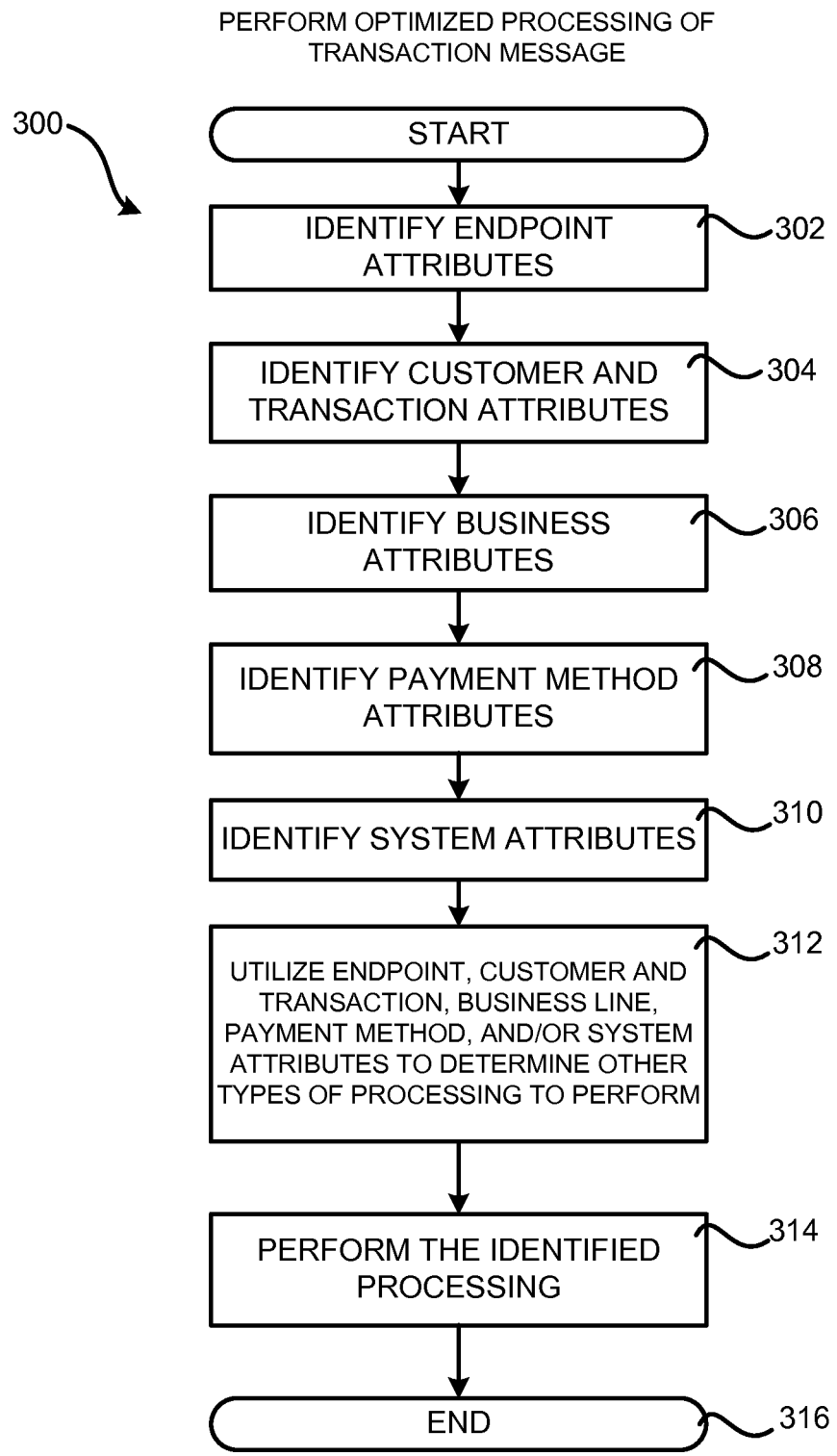
FIG. 3 is a flow diagram showing aspects of the operation of one mechanism disclosed herein for optimized processing of payment transactions, according to one embodiment disclosed herein.

FIG. 3 is a flow diagram showing a routine 300 that illustrates aspects of the operation of one mechanism disclosed herein for optimized processing of payment transactions, according to one embodiment disclosed herein. The routine 300 begins at operation 302, where the payment routing and processing platform 106 identifies the endpoint attributes 116 described above. The routine 300 then proceeds to operation 304, where the payment routing and processing platform 106 identifies the customer and transaction attributes 118 described above.

From operation 304, the routine 300 proceeds to operation 306, where the payment routing and processing platform 106 identifies the business attributes 114. The routine 300 then proceeds from operation 306 to operation 308, where the payment routing and processing platform 106 identifies the payment method attributes 120. The payment routing and processing platform 106 then identifies the system attributes 122 at operation 310.

From operation 310, the routine 300 proceeds to operation 312, where the payment routing and processing platform 106 utilizes some or all of the attribute types described above to identify other types of financial processing that are to be performed. For example, and as discussed above, some of the various attribute types described above might be utilized to determine if additional message characteristics should be applied to a payment transaction message 108, to determine when and how to retry a failed payment transaction message 108, to determine whether stand-in processing should be utilized for a particular transaction, and to determine when to utilize other features of the payments system 104, such as, but not limited to, authorization reuse, authorization reversal, charge aggregation, up front charge, and batch/real-time processing. The payment routing and processing platform 106 might also utilize some or all of the attributes described above to identify other types of processing operations to be performed.

From operation 312, the routine 300 proceeds to operation 314, where the processing identified at operation 312 is performed. The payment routing and processing platform 106 might perform the identified processing, or the identified processing might be performed by another component in the payments system 104 or the merchant system 102. From operation 314, the routine 300 proceeds to operation 316, where it ends.

Figure 4:
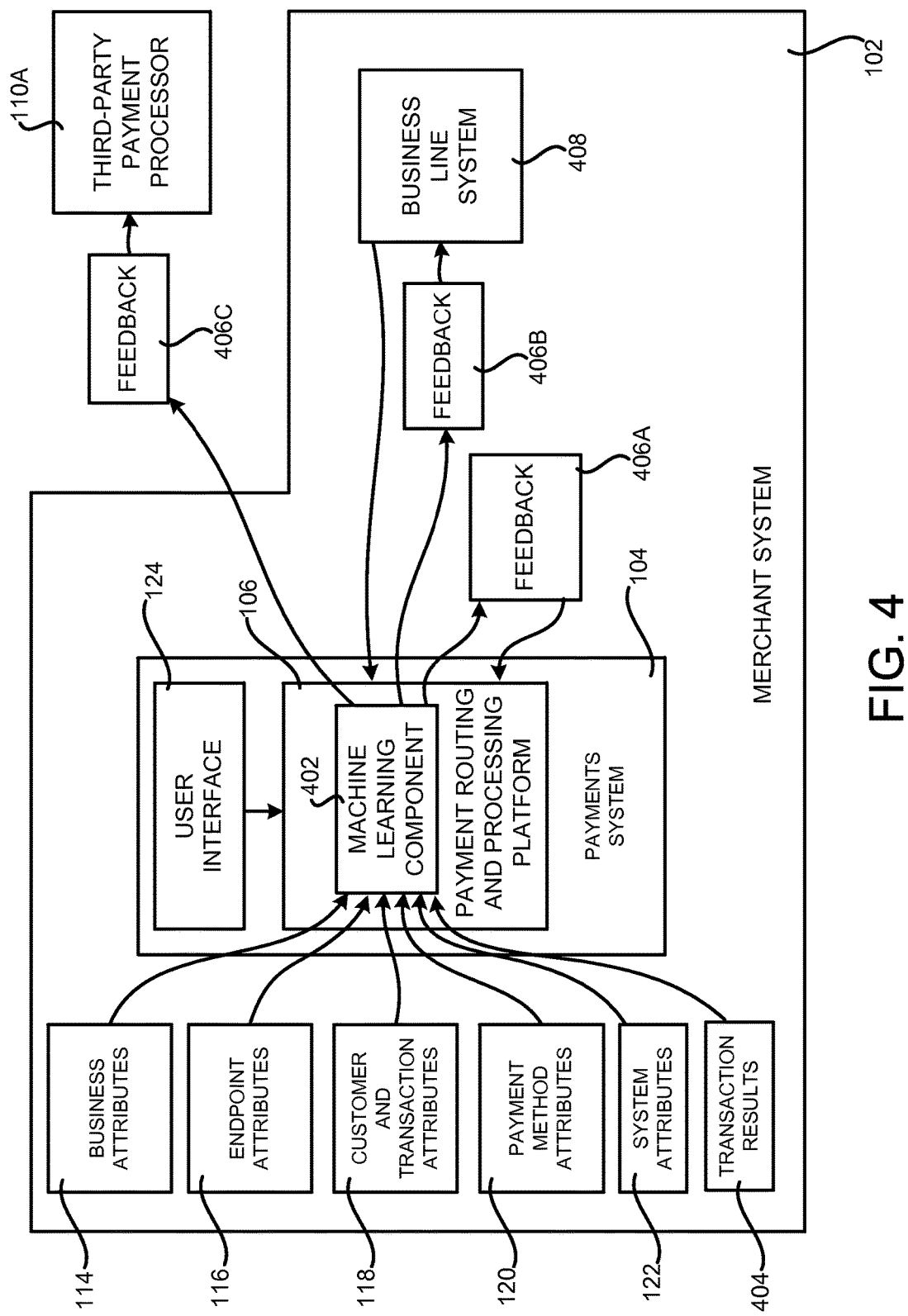
FIG. 4 is a software architecture diagram showing an overview of one illustrative mechanism described herein that utilizes machine learning to optimize the routing and processing of payment transactions, according to one embodiment disclosed herein.

FIG. 4 is a software architecture diagram showing an overview of one illustrative mechanism described herein that utilizes machine learning to optimize the operation of the payment routing and processing platform 106, according to one embodiment disclosed herein. In order to provide this functionality, the payment routing and processing platform 106 is configured with a machine learning component 402 in some implementations, such as the implementation illustrated in FIG. 4.

As shown in FIG. 4, the machine learning component 402 might collect some or all of the various attributes described above. For example, and as shown in FIG. 4, the machine learning component 402 might collect the business attributes 114, the endpoint attributes 116, the customer and transaction attributes 118, the payment method attributes 120, and/or the system attributes 122. The machine learning component 402 might also collect transaction results 404 that describe the results of payment transaction messages 108. For example, the transaction results 404 might indicate whether a particular payment transaction message 108 was accepted or declined. Values for some or all of the attributes described above might be collected for transactions processed by the payment routing and processing platform over some period of time, such as an hour or a day.

Once the machine learning component 402 has collected some or all of the attributes described above, the machine learning component 402 applies asynchronous machine learning techniques to the collected data to generate feedback 406A for the payment routing and processing platform 106. The payment routing and processing platform 106 may utilize the received feedback 406A to further optimize the various mechanisms described above for routing and processing financial transactions, such as payment transaction messages 108.

In some embodiments, the machine learning component 402 might also apply asynchronous machine learning techniques to the collected data to generate feedback 406B for a particular business line. The feedback 406B might be provided to a business line system 408 associated with a particular business line, for example. The feedback 406B might also be provided through the UI 124. The feedback 406B might include suggestions regarding how a particular business line might modify their processes to optimize the processing performed by the payment routing and processing platform 106 on their behalf.

In one particular example, for instance, a business line that provides digital items might utilize optimistic fulfillment and provide a customer with a digital item after three seconds if the payment transaction has not been completed. In this example, the machine learning component 402 might determine based upon an analysis of the endpoint attributes 116 that, on average, the payment routing and processing platform 106 processes transactions using a certain endpoint in 3.1 seconds. In this case, the machine learning component 402 might provide feedback to the business line recommending that the business line utilize 3.2 seconds as the cutoff for optimistic fulfillment. In this way, the risk of loss to the business line as a result of optimistic fulfillment might be reduced.

In another example, the machine learning component 402 might determine based upon an analysis of the attributes described above that a certain business line generates many small transactions that are frequently processed by an endpoint that charges a per transaction fee. In this case, the machine learning component might recommend to the business line that it utilize aggregation to aggregate transactions where possible. The machine learning component 402 might also recommend to the business line that it specify an endpoint that charges a percentage fee rather than a per transaction fee. In this way, the machine learning component 402 might assist a business line in lowering the cost of payment processing, and thereby increasing the business line's profits. It should be appreciated that the examples given above are merely illustrative and that the machine learning component 402 might perform other types of machine learning techniques to provide other types of feedback 406A and 406B to the payment routing and processing platform 106 and to the various business lines operating within the merchant system 102.

As shown in FIG. 4, the machine learning component 402 might also be configured in some implementations to provide feedback 406C to an endpoint, such as the third-party payment processor 110A. For example, the machine learning component 402 might utilize the machine learning techniques described above to identify a problem with the third-party payment processor 110A. In this example, the machine learning component 402 might provide feedback 406C to the third-party payment processor 110A identifying the detected problem. In other embodiments, the feedback 406C includes a suggestion, or suggestions, to the endpoint regarding ways in which the endpoint can improve its performance. For instance, in the example given above wherein optimistic fulfillment is performed after three seconds, the feedback 406C might inform the third-party payment processor 110A that a higher volume of transactions might be routed to the third-party payment processor 110A if the transactions can be processed in less than three seconds. The feedback 406C might also provide other types of information to an endpoint in other embodiments.

Figure 5:
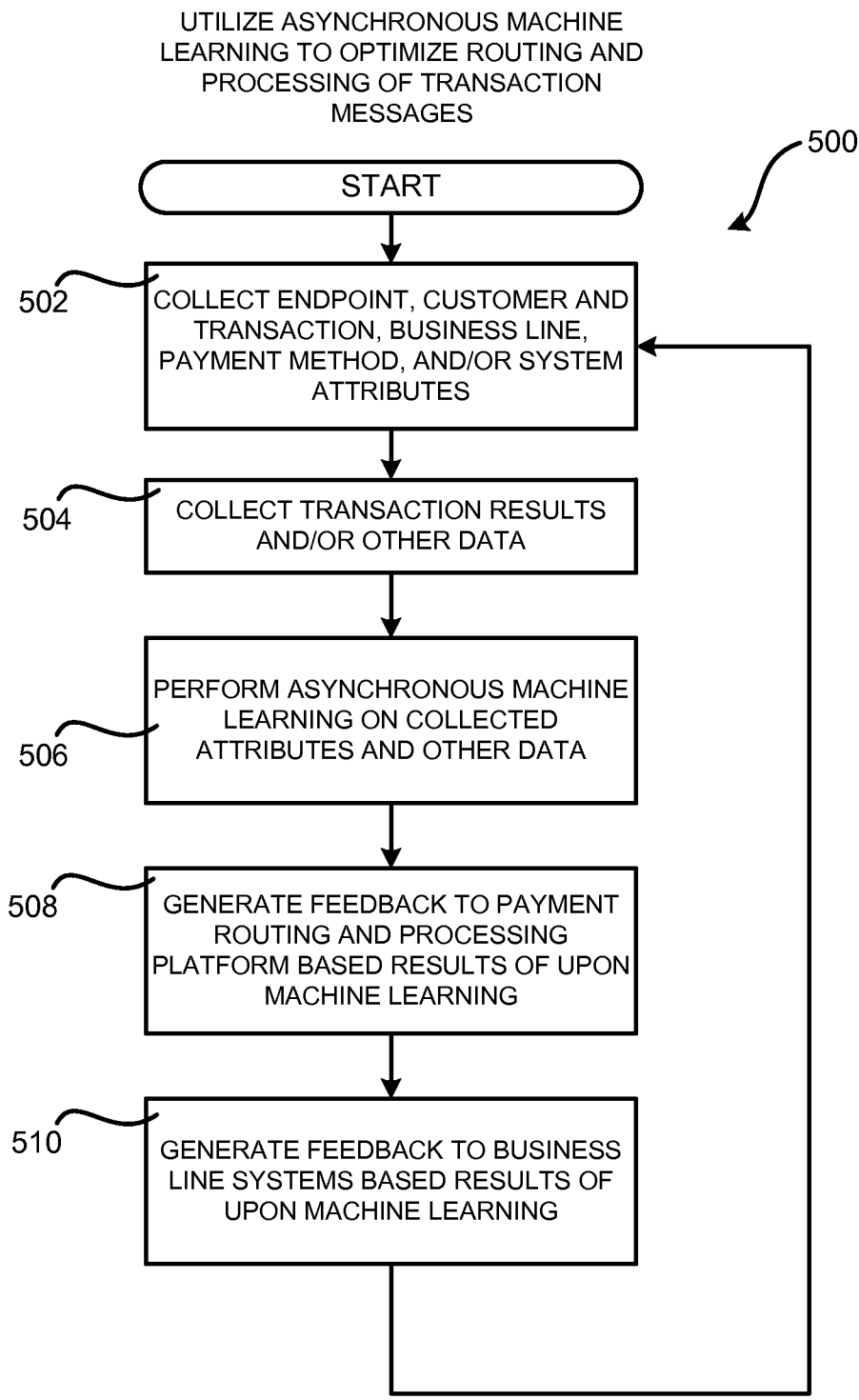
FIG. 5 is a flow diagram showing aspects of the operation of one mechanism disclosed herein that utilizes machine learning to optimize the routing and processing of payment transactions, according to one embodiment disclosed herein.

FIG. 5 is a flow diagram showing a routine 500 that illustrates aspects of the operation of one mechanism disclosed herein that utilizes machine learning to optimize the routing and processing of payment transactions, according to one embodiment disclosed herein. The routine 500 begins at operation 502, where the machine learning component 402 collects some or all of the attributes described above. For example, the machine learning component 402 might collect the business attributes 114, endpoint attributes 116, customer and transaction attributes 118, payment method attributes 120, and/or system attributes 122 for some period of time, such as a day or week. The routine 500 then proceeds from operation 502 to operation 504.

At operation 504, the machine learning component 402 may collect the transaction results 404. As discussed above, the transaction results 404 describe the results of payment transaction messages 108. The machine learning component 402 might collect the transaction results 404 for some period of time, such as a day or week. The routine 500 then proceeds from operation 504 to operation 506.

At operation 506, the machine learning component 402 performs asynchronous machine learning techniques on the attributes collected at operation 502 and on the transaction results collected at operation 504. As mentioned above, the machine learning techniques are applied in a manner designed to generate feedback 406A to the payment routing and processing platform 106 that can improve the routing and/or processing of payment transactions. The machine learning techniques might also be applied in a manner designed to generate feedback 406B to the business line systems 408 that can optimize aspects of the operation of the business lines relating to the processing of payment transactions.

From operation 506, the routine 500 proceeds to operation 508, where the machine learning component 402 generates and provides the feedback 406A to the payment routing and processing platform 106. The routine 500 then proceeds to operation 510, where the machine learning component 402 generates and provides the feedback 406B to the various business lines. From operation 510, the routine 500 proceeds back to operation 502, where the process described above might be periodically repeated in order to further optimize the payment transaction routing and processing operations described herein.

Figure 6:
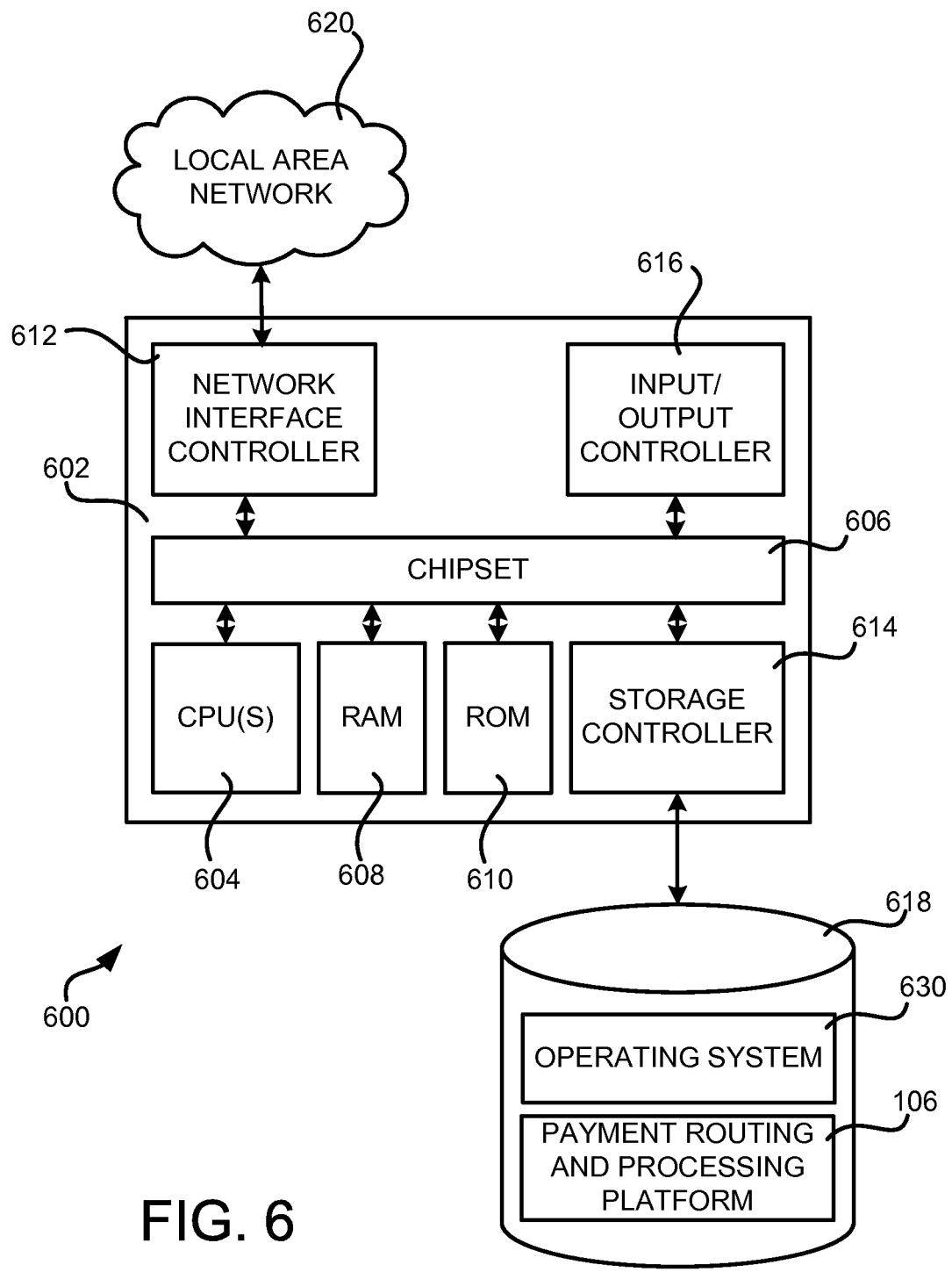
FIG. 6 is a computer architecture diagram showing an illustrative computer hardware architecture for implementing a computing device that might be utilized to implement aspects of the various embodiments presented herein.

FIG. 6 shows an example computer architecture for a computer 600 capable of executing the program components described above for optimizing the routing and processing of payment transactions. The computer architecture shown in FIG. 6 illustrates a conventional server computer, workstation, desktop computer, laptop, tablet, network appliance, personal digital assistant ("PDA"), e-reader, digital cellular phone, or other computing device, and may be utilized to execute any aspects of the software components presented herein. For example, the computer architecture shown in FIG. 6 may be utilized to execute the various program components shown in FIGS. 1 and 4 and described above.

The computer 600 includes a baseboard 602, or "motherboard," which is a printed circuit board to which a multitude of components or devices may be connected by way of a system bus or other electrical communication paths. In one illustrative embodiment, one or more central processing units ("CPUs") 604 operate in conjunction with a chipset 606. The CPUs 604 may be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 may provide an interface to a random access memory ("RAM") 608, used as the main memory in the computer 600. The chipset 606 may further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM may also store other software components necessary for the operation of the computer 600 in accordance with the embodiments described herein.

The computer 600 may operate in a networked environment using logical connections to remote computing devices and computer systems through a network, such as the local area network 620. The chipset 606 may include functionality for providing network connectivity through a NIC 612, such as a gigabit Ethernet adapter. The NIC 612 is capable of connecting the computer 600 to other computing devices over the network 620. It should be appreciated that multiple NICs 612 may be present in the computer 600, connecting the computer to other types of networks and remote computer systems.

The computer 600 may be connected to a mass storage device 618 that provides non-volatile storage for the computer. The mass storage device 618 may store system programs, application programs, other program modules, and data, which have been described in greater detail herein. The mass storage device 618 may be connected to the computer 600 through a storage controller 614 connected to the chipset 606. The mass storage device 618 may consist of one or more physical storage units. The storage controller 614 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 may store data on the mass storage device 618 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 618 is characterized as primary or secondary storage, and the like.

For example, the computer 600 may store information to the mass storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 may further read information from the mass storage device 618 by detecting the physical states or characteristics of one or more particular locations within the physical storage units.

In addition to the mass storage device 618 described above, the computer 600 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 600.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 618 may store an operating system 630 utilized to control the operation of the computer 600. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 618 may store other system or application programs and data utilized by the computer 600, such as software components for implementing the payment routing and processing platform 106 and/or any of the other software components and data described above. The mass storage device 618 might also store other programs and data not specifically identified herein.

In one embodiment, the mass storage device 618 or other computer-readable storage media is encoded with computer-executable instructions which, when loaded into the computer 600, transforms the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various routines described above with regard to FIGS. 2, 3, and 5. The computer 600 might also include computer-readable storage media for performing any of the other computer-implemented operations described herein.

The computer 600 may also include one or more input/output controllers 616 for receiving and processing input from a number of input devices, such as a keyboard, a mouse, a touchpad, a touch screen, an electronic stylus, or other type of input device. Similarly, the input/output controller 616 may provide output to a display, such as a computer monitor, a flat-panel display, a digital projector, a printer, a plotter, or other type of output device. It will be appreciated that the computer 600 may not include all of the components shown in FIG. 6, may include other components that are not explicitly shown in FIG. 6, or may utilize an architecture completely different than that shown in FIG. 6. It should also be appreciated that many computers, such as the computer 600, might be utilized in combination to embody aspects of the various technologies disclosed herein.

Based on the foregoing, it should be appreciated that technologies for optimizing the routing and processing of payment transactions have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for optimized routing of a payment transaction message to an endpoint for processing, the computer-implemented method comprising:
   dynamically monitoring endpoint attributes at least in part by transmitting messages to a plurality of endpoints and determining the endpoint attributes based on whether individual ones of the plurality of endpoints return responses to the messages, when the responses are sent or received, and/or contents of the responses;
   receiving a request to route the payment transaction message to a processing endpoint for processing, wherein the processing endpoint is one of the plurality of endpoints;
   based at least in part on the request, identifying, as one or more identified attributes, one or more business attributes, the endpoint attributes, customer and transaction attributes, payment method attributes, and system attributes;
   selecting a first endpoint from the plurality of endpoints for processing the payment transaction message based at least in part on the one or more identified attributes, the one or more identified attributes including at least a latency associated with the first endpoint;
   causing the payment transaction message to be routed to the first endpoint;
   selecting a second endpoint from the plurality of endpoints for processing a second payment transaction message, based on routing feedback determined by asynchronous machine learning applied to the one or more identified attributes;
   generating processing feedback for the second endpoint based on asynchronous machine learning applied to the one or more identified attributes, the processing feedback having one or more recommendations for the second endpoint to optimize processing of the second payment transaction message, including a recommendation to increase the speed of payment transaction processing to thereby convert an optimistic transaction in which digital content is delivered before payment processing is complete into a non-optimistic transaction in which the digital content is delivered after the payment processing is complete; and causing implementation of the one or more recommendations by the second endpoint by routing the processing feedback to the second endpoint.

2. The computer-implemented method of claim 1, further comprising increasing a number of transactions routed to the second endpoint based on the second endpoint implementing the one or more recommendations in the processing feedback.

3. The computer-implemented method of claim 1, wherein the business attributes indicate at least a product type and delivery type associated with the request.

4. The computer-implemented method of claim 1, wherein the endpoint attributes indicate at least an availability of a particular endpoint.

5. The computer-implemented method of claim 1, wherein the customer and transaction attributes comprise one or more attributes of a transaction relating to the payment transaction message and one or more attributes relating to a customer associated with the transaction.

6. The computer-implemented method of claim 1, wherein the payment method attributes comprise one or more attributes of a payment instrument specified by the payment transaction message.

7. The computer-implemented method of claim 1, wherein the system attributes comprise one or more attributes describing a current or historical operation of components within a payments system.

8. The computer-implemented method of claim 1, further comprising:
  utilizing the one or more identified attributes to identify one or more processing operations to be performed on the payment transaction message; and
  performing the one or more processing operations on the payment transaction message.

9. The computer-implemented method of claim 8, wherein performing the one or more processing operations comprises performing stand-in processing on the payment transaction message, the stand-in processing including processing the payment transaction message at an internal payment processor in a merchant system instead of at the first endpoint.

10. The computer-implemented method of claim 1, wherein the plurality of endpoints comprises a plurality of third-party payment processors configured to process the payment transaction message.

11. The computer-implemented method of claim 1, wherein at least one of the plurality of endpoints comprises an internal payment processor in a merchant system.

12. A system comprising:
  one or more processors;
  a communication interface; and
  one or more computer-readable media storing instructions executable by the one or more processors, wherein the instructions program the one or more processors to:
    dynamically monitor endpoint attributes at least in part by transmitting messages to a plurality of endpoints and determining the endpoint attributes based on whether individual ones of the plurality of endpoints return responses to the messages, when the responses are sent or received, and/or contents of the responses;
    receive a request to route a payment transaction message to one of the plurality of endpoints;
    select a first endpoint from the plurality of endpoints for processing the payment transaction message based at least in part on identified attributes including the endpoint attributes, the identified attributes including at least a latency associated with the first endpoint;
    route, via the communication interface, the payment transaction message to the first endpoint;
    selecting a second endpoint from the plurality of endpoints for processing a second payment transaction message;
    generating processing feedback including one or more recommendations to optimize processing of the second payment transaction message, wherein implementation of the processing feedback by the second endpoint increases a likelihood that the second endpoint will be selected instead of the first endpoint; and
    cause implementation of the one or more recommendations by the second endpoint by routing the processing feedback to the second endpoint.

13. The system of claim 12, wherein the instructions further program the one or more processors to process the payment transaction message based upon at least the identified attributes prior to routing the payment transaction message to the first endpoint.

14. The system of claim 12, wherein the identified attributes additionally include at least one of business attributes, customer and transaction attributes, payment method attributes, and system attributes.

15. The system of claim 12, wherein the first endpoint comprises at least one of a third-party payment processor configured to process the payment transaction message or an internal payment processor in a merchant system.

16. One or more non-transitory computer-readable media maintaining instructions executable by a processor to perform operations comprising:
  dynamically monitoring endpoint attributes at least in part by transmitting messages to a plurality of endpoints and determining the endpoint attributes based on whether individual ones of the plurality of endpoints return responses to the messages, when the responses are sent or received, and/or contents of the responses including transaction attributes and transaction results associated with a plurality of payment transactions processed by the plurality of endpoints;
  receiving, from a merchant system, a request to process a payment transaction message;
  identifying identified attributes associated with the payment transaction message; and
  selecting an endpoint for processing the payment transaction message from the plurality of endpoints based at least in part on the identified attributes and the endpoint attributes, wherein the endpoint attributes include includes at least a latency associated with the endpoint; and
  routing the payment transaction message to the endpoint, wherein the endpoint is selected based on the latency being low enough to convert an optimistic transition in which digital content is delivered before payment processing is complete into a non-optimistic transaction in which the digital content is delivered after the payment processing is complete.

17. The one or more non-transitory computer-readable media of claim 16, wherein the endpoint attributes are determined based at least in part on the transaction attributes and the transaction results associated with the plurality of payment transactions by applying asynchronous machine learning to the transaction attributes and the transaction results.

18. The one or more non-transitory computer-readable media of claim 16, wherein the endpoint comprises at least one of a third-party payment processor or an internal payment processor in a merchant system.

19. The one or more non-transitory computer-readable media of claim 16, wherein the identified attributes include at least one of business attributes, customer and transaction attributes, payment method attributes, and system attributes.

20. The system of claim 12, wherein the processing feedback includes a recommendation to increase the speed of payment transaction processing to thereby convert an optimistic transaction in which digital content is delivered before payment processing is complete into a non-optimistic transaction in which the digital content is delivered after the payment processing is complete.

21. The one or more non-transitory computer-readable media of claim 16, the operations further comprising generating processing feedback to optimize processing of the payment transaction message, wherein implementation of the processing feedback by the endpoint increases a likelihood that the endpoint will be selected instead of another endpoint of the plurality of endpoints.

* * * * *